United States Patent [19]
McGinness et al.

[11] Patent Number: 5,593,598
[45] Date of Patent: Jan. 14, 1997

[54] METHOD AND APPARATUS FOR CLOSED LOOP RECYCLING OF CONTAMINATED CLEANING SOLUTION

[76] Inventors: Michael P. McGinness, 2710 S. Shaver, Unit D, Pasadena, Tex. 77502; Warren Short, 855 Queen Annes, Suite 61, Houston, Tex. 77024

[21] Appl. No.: 230,346

[22] Filed: Apr. 20, 1994

[51] Int. Cl.$^6$ ............................................. C02F 1/78
[52] U.S. Cl. ..................... 210/748; 210/760; 134/10; 134/13; 205/688; 205/695; 205/756
[58] Field of Search ...................... 210/760, 748; 134/10, 13; 204/149, 150

[56] References Cited

U.S. PATENT DOCUMENTS

| | | | |
|---|---|---|---|
| 662,509 | 11/1900 | Van Den Brock | 210/760 |
| 767,195 | 8/1904 | Zerbe | 210/760 |
| 799,605 | 9/1905 | Lester | 210/760 |
| 3,546,114 | 12/1970 | Dietz et al. | 134/10 |
| 4,436,643 | 3/1984 | Bürger et al. | 134/10 |
| 4,609,488 | 9/1986 | Geke et al. | 134/10 |
| 5,409,616 | 4/1995 | Garbutt et al. | 210/760 |

FOREIGN PATENT DOCUMENTS

| | | | |
|---|---|---|---|
| 166999 | 12/1981 | Japan | 210/760 |
| 264133 | 11/1988 | Japan | 210/760 |

Primary Examiner—Neil McCarthy
Attorney, Agent, or Firm—Kenneth A. Roddy

[57] ABSTRACT

An advanced oxidation process and apparatus for closed loop treating and recycling of cleaning solutions contaminated with used surfactants, fats, oils, greases, and inorganic and organic contaminates converts the contaminated cleaning solution into a reusable cleaning solution containing useful polar water soluble surfactants, detergents, wetting agents and emulsifiers. The contaminated cleaning solution is subjected to an ozone containing gas and alternating direct current. The reaction with ozone containing gas is carried out in a mixed vapor (gas/liquid mist) state. Fats, oils, greases and organic contaminates are converted into useful polar water soluble surfactants, detergents, wetting agents and emulsifiers and the excess organic surfactants, detergents, wetting agents, and emulsifiers are simultaneously converted into carbon dioxide, nitrogen, and water. The treated cleaning solution is reused as the cleaning solution in the original cleaning process from which the contaminated cleaner was obtained. The rinse water in the cleaning process becomes contaminated with dilute reused cleaning solution and is recycled by reverse osmosis to separate the rinse water and reconcentrate the cleaning solution. The reconcentrated cleaning solution is returned to the original cleaning process for reuse and the reverse osmosis product water is returned to the original rinse station for reuse.

11 Claims, 1 Drawing Sheet

METHOD AND APPARATUS FOR CLOSED LOOP RECYCLING OF CONTAMINATED CLEANING SOLUTION

BACKGROUND OF THE INVENTION

1. Field of the Invention

This invention relates generally to advanced oxidation processes, and more particularly to a method and apparatus for closed loop recycling of contaminated cleaning solutions by subjecting the contaminated cleaning solution to an ozone containing gas and alternating direct current and recycling the rinse water and cleaning solution dragged into said rinse water using a reverse osmosis means to separate the rinse water and reconcentrate the cleaning solution prior to returning them to the original cleaning process.

2. Brief Description of the Prior Art

Industrial cleaning processes are currently being re-evaluated and redesigned in order to minimize the amount of waste produced and the resulting cost of waste disposal. Waste disposal costs have soared in recent years, and there is increasing pressure from congress, and the public to reduce the amount and the toxicity of all industrial waste streams.

Aqueous cleaning formulations used in spray washers are frequently quoted as being environmentally safe and biodegradable. However, when they are exhausted and ready for disposal they will always contain the contaminates that were removed from the dirty parts. Automotive contaminates include motor oil, transmission fluid, benzene, lead, cadmium and the used cleaning solution often includes organic compounds from other cleaning processes that are dragged in on the parts which have been cleaned, such as carburetor cleaner. These compounds include phenol, benzene, creosols, xylenes, chlorinated hydrocarbons and various paint solvents. Most of these compounds are now on the EPA's new "TCLP' hazardous waste list. Waste cleaners frequently leach more than the limit of these organic compounds and are therefore considered to be hazardous wastes.

In the past, disposing of weak contaminated cleaners and replacing them with fresh cleaners has been the most cost-effective option. Replacing a cleaning bath requires shutting down the cleaning process, draining out the old cleaner, and filling the tank with the new cleaner. Then the old cleaner must be tested and disposed of properly. Testing and disposal costs have soared in recent years.

It would therefore be desirable to extend the useful life of cleaning solutions. Mechanical filters, oil skimmers and special oil releasing cleaning formulas are becoming quite common. None of these methods has eliminated the need for continued frequent disposal of used cleaning solutions. Solvent based cleaners can be distilled and reused. However, they tend to be flammable, sources of air pollution, odorous, or depleters of the ozone layer. There is a major shift underway from hazardous solvent based cleaners to aqueous based cleaning products.

Products are commercially available to separate oils and greases from cleaning solutions to help increase the life of the cleaning bath. However, these products do not eliminate the eventual need for disposal of the contaminated oil or the spent cleaning solution. Some facilities have switched to very expensive burn-off ovens to burn off the oils and greases, followed by dry shot blasting. This method is extremely energy intensive and costly, and is not usable on plastic or aluminum.

Industries which generate waste must determine if their used cleaning wastes are hazardous before disposing of them. A complete lab analysis of just one waste stream can cost from $2,000 to $3,000.00 and disposal costs for hazardous waste vary from $300.00 to $1,200.00 per barrel. Even when the waste has been properly disposed of, the waste generator remains forever liable for any future problems caused by the waste.

The U.S. Environmental Protection Agency (EPA) now requires hazardous waste generators to certify on their hazardous waste manifests that the amount of hazardous waste produced has been minimized prior to shipping the waste. One current method is to boil the water off and ship the solids. This is one of the most energy intensive and costly methods available. Systems that boil 50 gallons/day can cost over $10,00.00 to purchase. They tend to scale easily, thus, reducing their energy efficiency and they do not solve the problem of solids disposal.

Another disposal option is to set up and man a small scale waste water treatment and neutralization system. This option requires trained operators, more chemicals, the energy required to pump and filter the solution prior to discharge, and a permit to discharge the treated waste water. These systems also produce large volumes of wet sludge requiring further treatment prior to disposal.

Chlorinated solvents are rapidly being phased out and replaced by aqueous cleaners in order to avoid the new ozone-depletion product-labeling law. This new law requires manufactures to label products which have been cleaned with ozone depleting chemicals as having been manufactured with an ozone depleting chemical. These solvents are being heavily taxed and considering waste disposal costs and cradle to grave liability issues, they are no longer cost effective. These market forces are driving industry to replace solvent cleaners with aqueous cleaners.

The following U.S. Patents and publications are discussed as further background and also as an information disclosure reviewing past attempts to solve the problems outlined above.

U.S. Pat. Nos. 3,149,906 and 4,212,330 discloses methods for treating animal fibers with gaseous ozone and steam wherein the ozone and steam mixture is used to shrink-proof proteinous animal fibers.

U.S. Pat. No. 5,097,556 discloses a laundry waste water treatment and wash process using only ozone as the bleaching and disinfecting means and excludes the use of any cleaning additives to the wash water other than ozone. The washing and ozone treatment are both ambient temperature processes and pertain to bleaching and disinfecting of laundry with detergent free rinse water. The rinse water is recycled using ozone and course mechanical filters. The bleaching and disinfecting is accomplished by rinsing with cold water containing ozone.

U.S. Pat. No. 4,220,529 discloses a process for the direct purification of cyanide contaminated rinse water by combining hydrogen peroxide and sodium hypochlorite to produce singlet oxygen in the contaminated rinse water.

U.S. Pat. No. 3,546,114 discloses a process for ozonation of industrial waste water at temperatures above 160° F. to sterilize the waste rinse water before reuse in rinsing new food containers and prior to packaging food in the rinsed containers.

U.S. Pat. No. 4,076,617 discloses a process for purifying waste material using a combination of ozone and ultrasonics.

U.S. Pat. Nos.: 3,746,756; 4,242,309; 4,185,025; 5,015,760; 5,103,061; 3,862,142; 4,404,110; 3,658,667; 3,637,

721; and 4,181,652; all relate to chemically manufacturing very specific compounds by reacting other very specific raw material compounds with ozone under very specific conditions. None of them suggest producing a reusable cleaning solution out of the contaminates dragged into the cleaning solution.

All of the references listed above related to either purifying waste water or to producing a completely different product, and none combine ozone and electrolytic treatment of a material.

In an article published in *Ozone Science and Engineering,* Vol. 12, Num. 2, 1990, p. 115–131, titled "Decomposition of Ethylene Glycol by the Combined Use of Ozone Oxidation and Electrolytic Methods", researchers Takahashi and Katshuki examined the rates of oxidation of ethylene glycol using ozone, electrolysis, and the combination of ozone and electrolysis simultaneously. Their research indicated that the reaction mechanism was different in all three cases since the reaction products were all different.

The present invention is distinguished over the prior art in general, and these patents in particular by an advanced oxidation process and apparatus for closed loop treating and recycling of cleaning solutions contaminated with used surfactants, fats, oils, greases, and inorganic and organic contaminates which converts the contaminated cleaning solution into a reusable cleaning solution containing useful polar water soluble surfactants, detergents, wetting agents and emulsifiers. The contaminated cleaning solution is subjected to an ozone containing gas and alternating direct current. The reaction with ozone containing gas is carried out in a mixed vapor (gas/liquid mist) state. Fats, oils, greases and organic contaminates are converted into useful polar water soluble surfactants, detergents, wetting agents and emulsifiers and the excess organic surfactants, detergents, wetting agents, and emulsifiers are simultaneously converted into carbon dioxide, nitrogen, and water. The treated cleaning solution is reused as the cleaning solution in the original cleaning process from which the contaminated cleaner was obtained. The rinse water in the cleaning process becomes contaminated with dilute reused cleaning solution and is recycled by reverse osmosis to separate the rinse water and reconcentrate the cleaning solution. The reconcentrated cleaning solution is returned to the original cleaning process for reuse and the reverse osmosis product water is returned to the original rinse station for reuse.

The present process permits the continued use of a cleaning solution long after it would have been dumped using previously known methods. Since the organic soils are converted from contaminates to cleaning compounds the need for frequent bath dumps is totally eliminated. Because oil and grease do not accumulate in the treated cleaning solution reverse osmosis may be used to recover and recycle the cleaner and rinse water from the cleaning process rinse water. The amount of water and chemicals needed to maintain the cleaning process is substantially reduced, and the cost of waste disposal is eliminated. The present process also allows the cleaning bath to be maintained at the peak performance of a new bath resulting in decreased cycle times and decreased energy consumption needed to clean the parts. This results in a more efficient and cost effective cleaning process.

SUMMARY OF THE INVENTION

It is therefore an object of the present invention to provide a process and apparatus for converting contaminated cleaning solutions into reusable cleaning solutions using an advanced oxidation means to attain the conversion.

It is another object of this invention to provide a process and apparatus for converting the contaminates in used contaminated cleaning solutions into useful soluble synthetic surfactants, wetting agents and emulsifiers by reacting the contaminates with an ozone containing gas.

Another object of this invention is to provide a process and apparatus for converting the excess build up of useful soluble synthetic surfactants, wetting agents and emulsifiers into carbon dioxide gas, nitrogen gas, and water using an advanced oxidation process.

Another object of this invention is to provide a process and apparatus for converting the excess build up of useful soluble synthetic surfactants, wetting agents and emulsifiers by subjecting them to an ozone containing gas and alternating direct current thereby converting said excess useful soluble synthetic surfactants, wetting agents and emulsifiers into carbon dioxide gas, nitrogen gas, and water.

Another object of this invention is to provide a process and apparatus for recycling rinse water and cleaning solution dragged into the rinse water using reverse osmosis to separate the rinse water and reconcentrate the cleaning solution prior to returning the reconcentrated cleaning solution back to the original cleaning process and prior to returning the separated reusable rinse water back the rinse stations.

Another object of this invention is to provide a process and apparatus that eliminates the need for occasional disposal and waste treatment of used cleaning solutions and contaminated rinse water by recycling the used cleaning solution and contaminated rinse water.

Another object of this invention is to provide a process and apparatus for producing and continuously maintaining a superior cleaning solution at its peak cleaning strength whereby the original cleaning process operates more efficiently by cleaning faster and by constantly maintaining the cleaning speed thereby reducing both the cleaning cycle time and the energy required to maintain the cleaning process.

Another object of this invention is to provide a process and apparatus for producing and continuously maintaining a superior cleaning solution in a cleaning process whereby the superior cleaning solution is capable of cleaning at reduced temperatures, as low as 70° F.

Another object of this invention is to provide a process and apparatus for producing and continuously maintaining a superior cleaning solution free of any accumulation of objectionable odors caused by odorous contaminates due to aromatic compounds used in pre-cleaners such as carburetor cleaners and paint strippers.

Another object of this invention is to provide a process and apparatus for recycling contaminated cleaning solutions which eliminates the need for maintenance and waste reverse osmosis cleaning compounds by simultaneously cleaning the reverse osmosis means while separating a contaminated rinse water from recyclable reusable cleaning solution wherein the rinse water contaminate is the recyclable reusable cleaning solution that cleans the reverse osmosis means prior to returning the recyclable reusable cleaning solution to the original cleaning process.

Another object of this invention is to provide a process and apparatus for recycling contaminated cleaning solutions which concentrates dry oxygen prior to transporting it to an ozone containing gas generator, thereby increasing the output of the ozone containing gas generator.

Another object of this invention is to provide a process and apparatus for recycling contaminated cleaning solutions which utilizes an ozone containing gas wherein the ozone is generated by a corona discharge, ultraviolet light, or an electrolytic ozone generator.

A still further object of this invention is to provide a process and apparatus for recycling contaminated cleaning solutions which is simple in construction and economical to operate.

Other objects of the invention will become apparent from time to time throughout the specification and claims as hereinafter related.

The above noted objects and other objects of the invention are accomplished by an advanced oxidation process and apparatus for closed loop treating and recycling of cleaning solutions contaminated with used surfactants, fats, oils, greases, and inorganic and organic contaminates which converts the contaminated cleaning solution into a reusable cleaning solution containing useful polar water soluble surfactants, detergents, wetting agents and emulsifiers. The contaminated cleaning solution is subjected to an ozone containing gas and alternating direct current. The reaction with ozone containing gas is carried out in a mixed vapor (gas/liquid mist) state. Fats, oils, greases and organic contaminates are converted into useful polar water soluble surfactants, detergents, wetting agents and emulsifiers and the excess organic surfactants, detergents, wetting agents, and emulsifiers are simultaneously converted into carbon dioxide, nitrogen, and water. The treated cleaning solution is reused as the cleaning solution in the original cleaning process from which the contaminated cleaner was obtained. The rinse water in the cleaning process becomes contaminated with dilute reused cleaning solution and is recycled by reverse osmosis to separate the rinse water and reconcentrate the cleaning solution. The reconcentrated cleaning solution is returned to the original cleaning process for reuse and the reverse osmosis product water is returned to the original rinse station for reuse.

DESCRIPTION OF THE PREFERRED EMBODIMENTS

Figure 1:
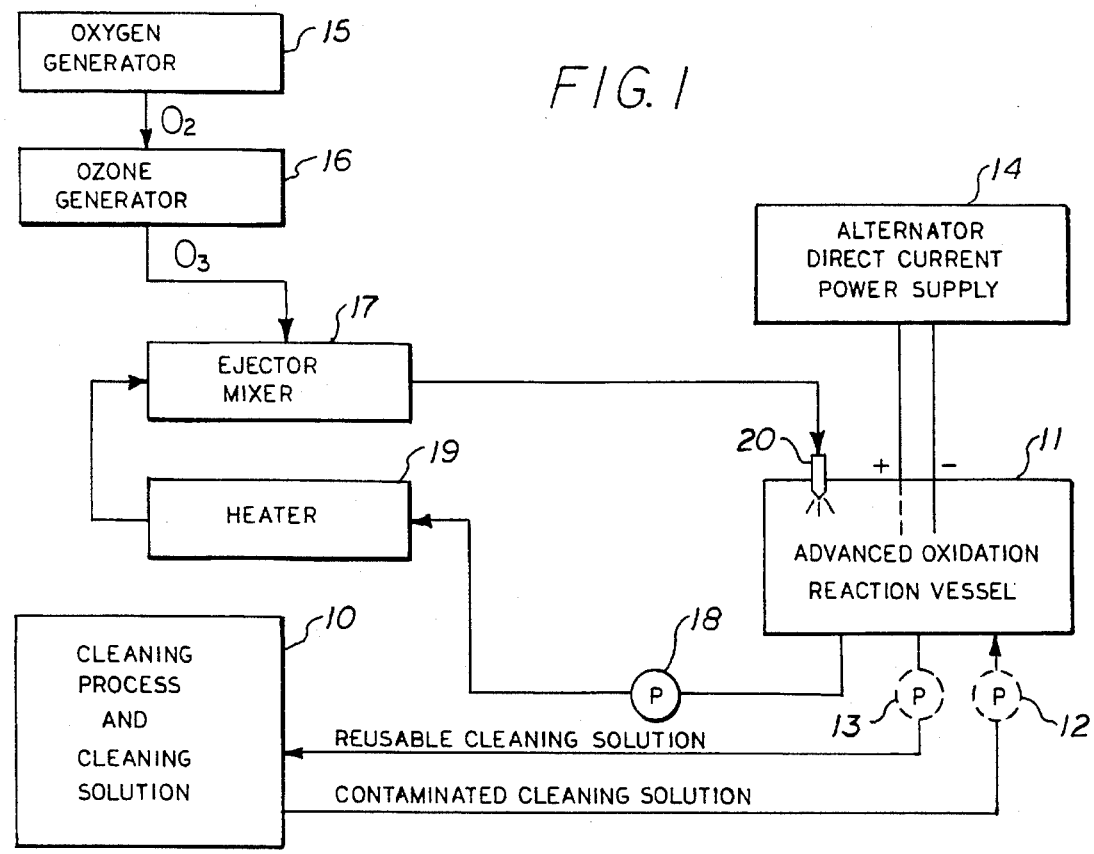
FIG. 1 is a flow diagram of a closed loop advanced oxidation reaction process for recycling used contaminated cleaning solutions generated in accordance with the present invention.

Referring to the diagrams by numerals of reference, there is shown in FIG. 1, an advanced oxidation reaction process in accordance with the present invention. Contaminated cleaning solution is transported from an original cleaning process 10 to an advanced oxidation reaction vessel 11 by gravity flow or other suitable means, such as a pump 12. Such a pump may be a sole purpose pump or a split feed from the cleaning process wash pump. The treated reusable cleaning solution is transported back to the cleaning process 10 either by gravity flow or by a pump 13, with a gravity flow being preferred. A preferred pump is a conventional sealess electro-mechanical centrifugal pump suitable for harsh chemical service and temperatures up to the boiling point of the cleaning solution (typically below 220° F.). Other pumps such as air driven positive displacement double diaphragm pumps would also be suitable for this service.

The advanced oxidation reactor vessel 11 may be constructed of heavy wall mild steel, thin wall stainless steel, linear low density polyethylene, polytetraflouroethylene, or other suitable materials. The reactor operates at atmospheric pressure and is therefore not required to be a pressure vessel.

The advanced oxidation reaction vessel 11 is provided with a plurality of electrodes which are submerged in the contaminated cleaning solution that is contained in the reaction vessel. The electrodes are connected to a source of alternating direct current 14. A standard variable direct current power supply may be used to convert a 60 cycle alternating electrical power source into direct current. The preferred electrodes are formed of platinum coated titanium or platinum coated niobium coated titanium.

A control circuit relay and timer device periodically turns off the DC current power supply and reverses the DC current polarity to the plurality of electrodes. The direct current is then turned back on by the timer relay circuit device. It is preferred that the voltage of the circuit be maintained between 2 and 6 volts, however certain low conductivity cleaners may require voltages as high as 40 volts. The periodic reversal of the voltage keeps the electrodes clean, maintains their conductivity, and provides for stripping any contaminates off of the electrodes that might plate out of the cleaner onto the electrodes thereby raising the overvoltage required to maintain a steady current.

The surface area of the plurality of electrodes must be sufficient based on the solution conductivity, electrode spacing and operating overvoltage to maintain the required current. Since the solution conductivity is subject to vary over a wide range, the electric current density will also be subject to vary over a wide range. The electrode spacing is minimized to reduce power losses due to resistance and maximized to eliminate the possibility of shorting or bridging between the electrodes. A spacing of between ½" to ¾" is the preferred distance between the plurality of electrodes.

Certain contaminates such as flouride ions in the contaminated cleaning solution will dictate the choice of materials of construction used in constructing the electrodes. For instance, although platinum coated titanium electrodes are described in the preferred embodiment, other materials suitable for solutions containing high levels of flouride ions may be used.

An oxygen concentrator 15 is connected to an ozone generator 16. Oxygen is concentrated in the oxygen concentrator 15 and is passed through the ozone generator 16 where the oxygen gas is converted into an ozone containing gas. In a preferred embodiment the ozone containing gas is produced in small quantities for small cleaning systems with an ultraviolet light ozone generator where ambient air is drawn through the ozone generator and some of the oxygen in the ambient air is converted to ozone.

Alternatively, the ozone generator 16 may be a corona discharge ozone generator capable of producing larger quantities of ozone more efficiently than with ultraviolet light. A corona discharge ozone generator when feed with concentrated oxygen produces proportionally larger quantities of ozone at higher concentrations. The corona discharge ozone generator embodiment would include the use of a pressure swing adsorption oxygen concentrator to produce and supply concentrated dry oxygen to the corona discharge ozone generator.

The ozone containing gas is drawn from the ozone generator 16 and into the vacuum port of an ejector mixer 17. The ejector mixer 17 generates a vacuum when the contaminated cleaning solution is pumped through the ejector by an ejector feed pump 18. The ejector feed pump 18 circulates the contaminated cleaning solution from the reaction vessel 11 to an inline electric heater 19 which heats the solution and then the contaminated cleaning solution is passed through the ejector mixer 17 then through an atomizing nozzle 20 and back into the reactor vessel 11. The vacuum is produced by the expansion of the contaminated cleaning solution as it passes through the ejector mixer 17. Thus, the ozone containing gas is premixed with the contaminated cleaning solution in the ejector mixer 17 before being atomized into the reactor vessel 11. In some cases, a portion of the cleaning process pump flow may be used to eliminate the need for a separate ejector feed pump.

Figure 2:
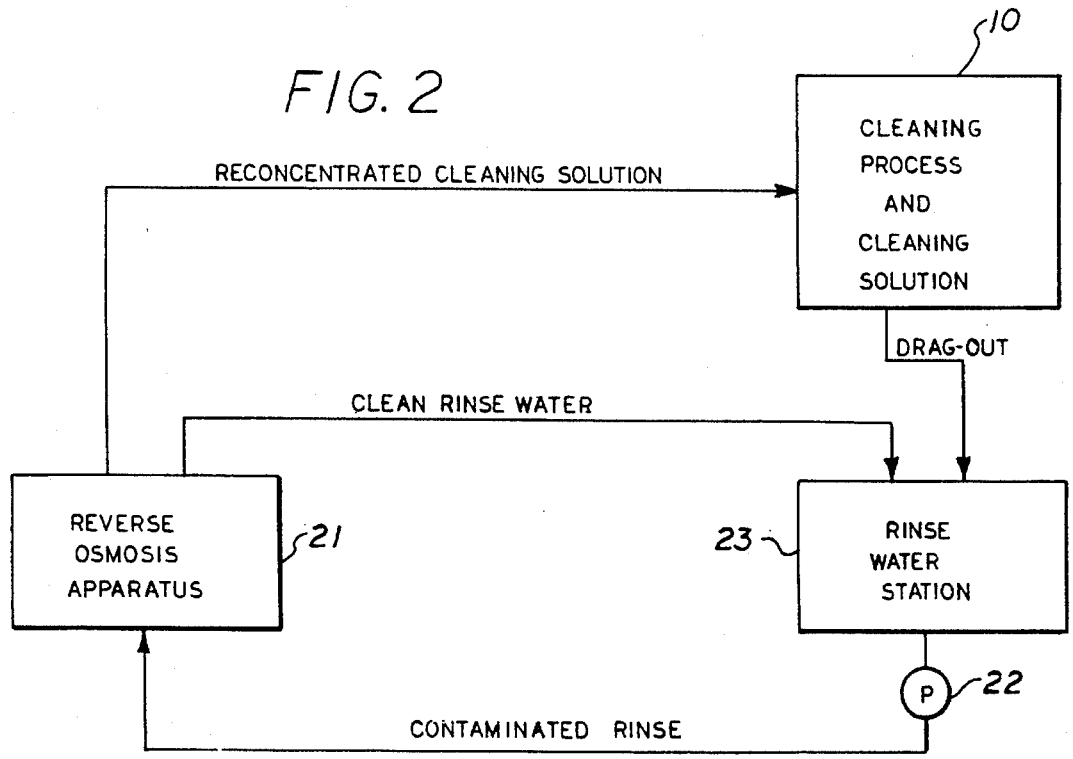
FIG. 2 is a flow diagram of the recyclable rinse water/dilute recyclable cleaning solution mixture, separation, recovery, and recycling stages of the process in accordance with the present invention.

Referring now to FIG. 2, the recyclable rinse water/dilute recyclable cleaning solution mixture, separation, recovery, and recycling stages of the process are illustrated by the flow diagram. The "cleaning process and cleaning solution" box 10 of FIG. 2 is the same as the "cleaning process and cleaning solution" box 10 of FIG. 1. The reused cleaning solution is utilized as the cleaning solution in the original cleaning process from which the contaminated cleaner was obtained. After rinsing in the cleaning process, the rinse water becomes contaminated with dilute reusable cleaning solution.

The contaminated rinse is transported to a reverse osmosis apparatus 21 by a pump 22. The preferred pump 22 is a high pressure positive displacement pump which is capable of pressures up to 1,000 pounds per square inch. The contaminated rinse is then separated by reverse osmosis into a reconcentrated reusable cleaning solution and clean reusable recyclable rinse water. The reconcentrated reusable cleaning solution is then returned back to the original cleaning process and cleaning solution station 10, and the reverse osmosis product water is returned to the original rinse station 23 for reuse.

In a preferred embodiment the reverse osmosis apparatus 21 is a plurality of reverse osmosis membranes feed by the high pressure positive displacement pump 22. The high pressure pump 22 may serve as the means of feeding the contaminated rinse water to the reverse osmosis membrane apparatus 21 and the means of transporting the reusable cleaning solution and reusable rinse water back to the original cleaning process 10 and the original rinse station 23, respectively.

Separation by reverse osmosis means is made practical because the contaminates which would otherwise foul the reverse osmosis membranes have been converted by the present process to useful surfactants, wetting agents, detergents and emulsifiers that will actually clean the reverse osmosis membranes while being concentrated in the reverse osmosis membranes.

In some installations, the reverse osmosis apparatus 21 is not needed. In this modification, the contaminated rinse water is used as make-up feed water to the cleaning process 10 to replace water lost to evaporation and dragout.

It should be understood, that various steps in the preferred embodiment described in detail herein may be carried out as either batch steps or continuous process steps, and although the invention has been described utilizing tank-type vessels, other types of vessels, such as tube-type or pipeline reactor vessels may be used.

Variations in the electrode size, electrode shape, electrode spacing, electrode current density, electrode overvoltage, insoluble electrode materials of construction, and solution additives may be used to compensate for variations in the size of the original cleaning system, variations in the original cleaning solution formula, and for variations in the chemistry of the contaminates themselves.

For example, if the cleaning solution contaminates in one system have no sodium chloride content and the cleaning solution contaminates in the second system contain large amounts of sodium chloride, system number 1 may need additions of sodium chloride while system number 2 would not. Furthermore, system number 1 may need either a higher voltage, a larger electrode surface area, additions of an electrolyte, such as sodium chloride, to increase the solution's electrical conductivity or any combination of these in order to generate an adequate current flow to accomplish the process of this invention.

Additives may also be added periodically to the cleaning solution either as cleaning additives themselves or as precursers that are converted into surfactants, wetting agents and emulsifiers to improve the performance of the cleaning solution. The additives may be very specialized surfactants, wetting agents or emulsifiers or they may be raw waste materials such as used antifreeze, used mineral spirits, used crankcase motor oil, etc. that would act as organic feed stock to the reactor and be converted into useful surfactants, wetting agents and emulsifiers. Such additives may be necessary in some cleaning systems where the ratio of organic contaminates to inorganic contaminates is too low or where the ratio has changed and the system has not yet been balanced to compensate for the new ratio.

EXAMPLE

A prototype unit has been tested on an automotive spray washer that is used to clean engine blocks and heads prior to their being remanufactured. In a recent test a completely exhausted 60 gallon cleaning bath, 1 year old, was restored to 80% of the performance of the original cleaning bath in less than 8 hours of processing. In a second test, 4 gallons of motor oil were introduced into the same 60 gallon cleaning bath. The cleaning solution and oil mixture was then processed for 16 additional hours.

Ozone was produced using a corona discharge ozone generator fed by a pressure swing adsorption oxygen concentrator. A 24 volt direct current power supply and two platinum coated titanium electrodes were used. The electrodes were housed in a low density polyethylene reactor vessel. An electric sealess centrifugal pump was used to pump the cleaning solution.

The cleaner was heated and operated at 140° F. and 200° F. The cleaning solution was feed through the nozzles at 60 pounds of pressure by a 5 HP pump. Since the cleaner was heated, a great deal of water was lost to evaporation. The rinse water was reused as make up water to replace the water lost to evaporation.

Careful evaluation revealed that oxidation of the motor oil had generated enough oxygenated water soluble synthetic surfactants to increase the cleaning performance far beyond the capability of the original cleaner. The recycled cleaning bath was performing 100% better than the new original formulation. In effect, the process produced a superior cleaning solution from a dead, unusable cleaning bath that was loaded with grease and oil. Furthermore the cleaner was converted into an excellent cold cleaning solution.

Separate tests using just ozone and ozone and electrolysis were conducted. Cleaning performance was enhanced by adding used motor oil and ozone to the used cleaner.

Cleaning performance was reduced after sufficient exposure of an isolated quantity of used cleaner to both ozone and the alternating direct current indicating that we were able to convert excess surfactants, wetting agents, and emulsifiers into carbon dioxide, nitrogen, and water.

The economics of the process are based on the following cleaning system cost reductions: (1) water is reused; (2) the cleaner is reused, thus, the need to purchase replacement cleaning chemicals is eliminated; (3) Waste disposal costs are eliminated; (4) Since the cleaning performance is constant and does not decline with use, and considering the improved cleaning performance when compared to standard purchased formulas, the cost of power and fuel to operate the present cleaning process can be reduced by 50 to 90%; and, (5) the cleaning system can be operated at lower temperatures, further reducing operating costs. It has been found that the recycled cleaning solution is capable of cleaning at temperatures as low as 70° F.

It should be understood that the cleaning process vessel may also serve as the advanced oxidation reactor vessel. For new cleaning system designs this would result in a considerable savings for the purchaser of new cleaning systems by eliminating the expense of an additional vessel and the associated circulation pumps and plumbing.

While this invention has been described fully and completely with special emphasis upon preferred embodiments, it should be understood that within the scope of the appended claims the invention may be practiced otherwise than as specifically described herein.

We claim:

1. An oxidation process for treating a contaminated cleaning solution containing water, used surfactants, ionic salts, fats, oils, greases, and inorganic and organic contaminants to convert the contaminated cleaning solution into a reusable cleaning solution containing useful polar water soluble surfactants, detergents, wetting agents and emulsifiers, comprising the steps of:

mixing said contaminated cleaning solution with an ozone containing gas in an amount sufficient to convert the organic contaminants contained in the contaminated cleaning solution into useful polar water soluble surfactants, detergents, wetting agents and emulsifiers; and subjecting the liquid phase of said contaminated cleaning solution to an electric current in an amount sufficient to convert the fats, oils, greases and organic contaminants into useful polar water soluble surfactants, detergents, wetting agents and emulsifiers and simultaneously convert excess organic surfactants, detergents, wetting agents, and emulsifiers into carbon dioxide, nitrogen, and water;

said treated reusable cleaning solution having a cleaning strength at least as great as the strength of the original cleaning solution prior to contamination.

2. The process according to claim 1 including the step of heating said contaminated cleaning solution prior to mixing said contaminated cleaning solution with said ozone containing gas.

3. The process according to claim 2 including the step of atomizing said heated contaminated cleaning solution into a vapor prior to mixing said contaminated cleaning solution with said ozone containing gas.

4. The process according to claim 1 including the step of after converting the organic contaminants contained in the contaminated cleaning solution into useful polar water soluble surfactants, detergents, wetting agents and emulsifiers;

utilizing said treated reusable cleaning solution as the cleaning solution in the original cleaning process from which the contaminated cleaning solution was obtained.

5. The process according to claim 4 including the steps of after utilizing said treated reusable cleaning solution as the cleaning solution in the original cleaning process, rinsing said treated reusable cleaning solution with a rinse water to form a rinse water contaminated with said treated reuseable cleaning solution and collecting said contaminated rinse water, and physically separating said treated reusable cleaning solution from said contaminated rinse water.

6. The process according to claim 5 including the steps of utilizing clean rinse water separated from said contaminated rinse water as the rinse water in the original cleaning process, and utilizing said treated reusable cleaning solution separated from said contaminated rinse water as the cleaning solution in the original cleaning process.

7. The process according to claim 5 wherein said step of physically separating said contaminated rinse water is accomplished by reverse osmosis.

8. The process according to claim 1 including the step of adding electrolytic salts to said contaminated cleaning solution to increase the electrical conductivity of said contaminated cleaning solution prior to subjecting said contaminated cleaning solution to said ozone containing gas and said electric current.

9. The process according to claim 8 wherein said electrolytic salts serve as surfactants, detergents, wetting agents, emulsifiers and saponifiers.

10. The process according to claim 1 wherein said step of mixing said contaminated cleaning solution with said ozone containing gas and subjecting it to said electric current comprises subjecting the liquid phase of said contaminated cleaning solution to alternating direct electrical current.

11. The process according to claim 10 wherein said step of subjecting said contaminated cleaning solution to said alternating direct electric current comprises passing said alternating direct electric current between a plurality of insoluble electrodes submerged in said contaminated cleaning solution.

* * * * *